United States Patent
Horikoshi et al.

(10) Patent No.: US 11,130,851 B2
(45) Date of Patent: Sep. 28, 2021

(54) PARTICULATE NUCLEATING AGENT, RESIN COMPOSITION, MOLDED PRODUCT, AND PRODUCTION METHOD THEREOF

(71) Applicant: ADEKA CORPORATION, Tokyo (JP)

(72) Inventors: Takahiro Horikoshi, Saitama (JP); Yuri Yokota, Saitama (JP)

(73) Assignee: ADEKA CORPORATION, Tokyo (JP)

( * ) Notice: Subject to any disclaimer, the term of this patent is extended or adjusted under 35 U.S.C. 154(b) by 0 days.

(21) Appl. No.: 16/967,355

(22) PCT Filed: Feb. 7, 2019

(86) PCT No.: PCT/JP2019/004405
§ 371 (c)(1),
(2) Date: Aug. 4, 2020

(87) PCT Pub. No.: WO2019/159804
PCT Pub. Date: Aug. 22, 2019

(65) Prior Publication Data
US 2021/0032436 A1 Feb. 4, 2021

(30) Foreign Application Priority Data
Feb. 15, 2018 (JP) .............................. JP2018-025245

(51) Int. Cl.
| | |
|---|---|
| *C08K 5/00* | (2006.01) |
| *B29C 43/00* | (2006.01) |
| *C08K 5/527* | (2006.01) |
| *C08L 23/00* | (2006.01) |
| *C08L 101/00* | (2006.01) |

(52) U.S. Cl.
CPC .......... *C08K 5/0083* (2013.01); *B29C 43/003* (2013.01); *C08K 5/527* (2013.01); *C08L 23/00* (2013.01); *C08L 101/00* (2013.01); *C08K 2201/016* (2013.01)

(58) Field of Classification Search
CPC .............................. C08K 5/0083; C08K 5/527; C08K 2201/016; B29C 43/003; C08L 23/00; C08L 101/00
USPC ....................................................... 524/108
See application file for complete search history.

(56) References Cited

U.S. PATENT DOCUMENTS

| | | | |
|---|---|---|---|
| 6,787,067 | B2 | 9/2004 | Yukino et al. |
| 7,714,046 | B2 | 5/2010 | Ishii et al. |
| 7,842,700 | B2 | 11/2010 | Fujita et al. |
| 8,268,844 | B2 | 9/2012 | Fujita et al. |
| 8,686,074 | B2 | 4/2014 | Tanji et al. |
| 2003/0125432 | A1 | 7/2003 | Yukino et al. |
| 2008/0108637 | A1 | 5/2008 | Fujita et al. |
| 2009/0156744 | A1 | 6/2009 | Ishii et al. |
| 2010/0204374 | A1 | 8/2010 | Tanji et al. |
| 2011/0009434 | A1 | 1/2011 | Fujita et al. |
| 2018/0230293 | A1 | 8/2018 | Fukushima et al. |

FOREIGN PATENT DOCUMENTS

| | | | |
|---|---|---|---|
| EP | 1 209 190 A1 | 5/2002 | |
| EP | 1209190 A1 * | 5/2002 | ............. C08K 5/527 |
| EP | 1 209 190 B1 | 3/2006 | |
| ES | 2 416 354 | 7/2013 | |
| JP | H02178341 | 7/1990 | |
| JP | 2001 59040 A | 3/2001 | |
| JP | 2003 335968 A | 11/2003 | |
| JP | 2005 320399 A | 11/2005 | |
| JP | 2007 297465 A | 11/2007 | |
| KR | 10-0607559 | 7/2006 | |
| KR | 2010-0075876 | 7/2010 | |
| RU | 2 428 441 | 9/2011 | |
| WO | 02/36677 | 5/2002 | |
| WO | 2007 039997 A1 | 4/2007 | |
| WO | 2009/016022 | 2/2009 | |
| WO | 2017 029970 A1 | 2/2017 | |

OTHER PUBLICATIONS

JP2003-335968A—machine translation (Year: 2003).*
International Search Report issued in International Patent Application No. PCT/JP2019/004405, dated Mar. 12, 2019 and English Translation thereof.
Written Opinion of the International Searching Authority (PCT/ISA/237) issued in International Patent Application No. PCT/JP2019/004405, dated Mar. 12, 2019 and English Translation thereof.
Russian Office Action issued with respect to Russian Application No. 2020130044, dated Feb. 20, 2021.
Indian Examination report issued with respect to Indian Application No. 202017036609, dated Jan. 29, 2021.

* cited by examiner

*Primary Examiner* — Ling Siu Choi
*Assistant Examiner* — Ronald Grinsted
(74) *Attorney, Agent, or Firm* — Greenblum & Bernstein, P.L.C.

(57) ABSTRACT

A particulate nucleating agent is provided and includes an aromatic phosphate ester metal salt represented by a predetermined formula, where the following is satisfied: a maximum particle diameter of the particulate nucleating agent is denoted by $D_{max}$ and a degree of dispersion of the particulate nucleating agent is denoted by $D_p$, 80 µm≤$D_{max}$≤300 µm and 1.0%≤$D_p$≤27.0%.

13 Claims, No Drawings

PARTICULATE NUCLEATING AGENT, RESIN COMPOSITION, MOLDED PRODUCT, AND PRODUCTION METHOD THEREOF

TECHNICAL FIELD

The present invention relates to a particulate nucleating agent, a resin composition, a molded product, and a production method thereof.

BACKGROUND ART

As a modification technique of a polymer material, a technique of adding a crystal nucleating agent or a crystallization accelerator is known. As such a kind of technique, a technique disclosed in Patent Document 1 is known, for example. Patent Document 1 discloses that a nucleating agent (hereinafter, nucleating agent such as the crystal nucleating agent and the crystallization accelerator is collectively referred to as "nucleating agent") having an average particle diameter of 0.001 to 3.0 μm is added to a crystalline polylactic acid (claims 1 and 3 of Patent Document 1 and the like).

RELATED DOCUMENT

Patent Document

[Patent Document 1] Japanese Unexamined Patent Publication No. 2005-320399

SUMMARY OF THE INVENTION

Technical Problem

However, as a result of examination by the present inventors, it was found that there was room for improvement in terms of dust workability and transparentizing properties in the nucleating agent disclosed in Patent Document 1.

Solution to Problem

As a result of examination by the present inventors, the following finding was obtained.

A general nucleating agent is a particulate body (particulate nucleating agent) obtained by mixing (kneading) each raw material component and drying thereof, and then pulverizing thereof, depending on the necessity. The particulate nucleating agent is melt-kneaded with a thermoplastic resin such as crystalline polymer, and used in a heating and molding process of the thermoplastic resin.

In mass production of particulate nucleating agents, in a case of considering scale-up from a laboratory scale, it was clarified that further improvement in dust workability such as handling properties in various use environments such as transport, kneading, and storage is required for particulate nucleating agents. Such dust workability is required not only in the process of production, transporting, and storing of the particulate nucleating agent, but also in the production process of a mixture product (composition) or thermoplastic resin using the particulate nucleating agent, and in the mass production thereof.

From a viewpoint of improving transparentizing properties, the dust workability becomes a big problem as the particle diameter of the particulate nucleating agent becomes smaller. Therefore, a method of changing the pulverization conditions for reducing the particle size to relatively mild conditions was examined. However, there was a concern that as large particles are entrapped in the particulate nucleating agent, transparentizing properties deteriorate.

The present inventors have conducted research based on such development circumstances and found that it is possible to improve dust workability by controlling dust characteristics of the particulate nucleating agent by mild pulverizing conditions, and it is possible to improve transparentizing properties by improving the dust workability and cutting coarse particles by combing. As a result of further intensive studies, the present inventors found that it is possible to stably evaluate dust workability and transparency by using a degree of dispersion and a maximum particle size of the particulate nucleating agent as indices, and it is possible to improve dust workability and transparentizing properties by controlling an upper limit of the degree of dispersion and an upper limit of the maximum particle diameter to a predetermined value or less, thereby completing the present invention.

According to the present invention, there is provided a particulate nucleating agent containing a compound represented by the following General Formula (1), in which in a case where dry measurement of particle diameter distribution of the particulate nucleating agent is performed by using a laser diffraction particle size distribution measurement method, a maximum particle diameter of the particulate nucleating agent is denoted by $D_{max}$, and a degree of dispersion of the particulate nucleating agent measured according to the following procedure is denoted by $D_p$, $D_{max}$ satisfies the following Expression (A) and $D_p$ satisfies the following Expression (B).

$$80\ \mu m \leq D_{max} \leq 300\ \mu m \quad \text{Expression (A)}$$

$$1.0\% \leq D_p \leq 27.0\% \quad \text{Expression (B)}$$

(Procedure)

A predetermined amount of a particulate nucleating agent is prepared as a sample. The sample is put into a cylinder from a height of 60 cm, and the sample is dropped vertically in the cylinder. Then, the amount of the sample remaining on a watch glass installed at the drop point is measured. Using the amount of the input sample and the amount of the sample remaining on the watch glass, a degree of dispersion (%) is measured based on the following expression.

Degree of dispersion(%)=[(input sample amount (g)−sample amount remaining on watch glass (g))/input sample amount (g)]×100

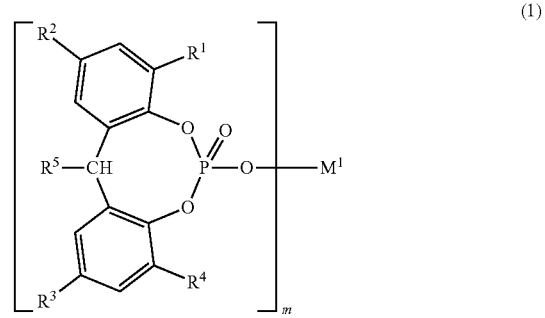

(1)

(In General Formula (1), $R^1$ to $R^4$ each independently represent a hydrogen atom, a straight chain or branched alkyl group having 1 to 9 carbon atoms, $R^5$ represents a hydrogen atom or an alkyl group having 1 to 4 carbon atoms, m represents 1 or 2, in a case where m is 1, $M^1$ represents a hydrogen atom, $Al(OH)_2$, or an alkali metal atom, and in a case where m is 2, $M^1$ represents a Group II element, $Al(OH)$, or Zn.)

The present inventors have conducted research based on such development circumstances, and found that it is possible to control dust characteristics by appropriately adjusting a particle diameter profile of a particulate nucleating agent. As a result of further intensive studies, as a particle diameter profile, by appropriately controlling an upper limit and a lower limit of a maximum particle diameter $D_{max}$ within a predetermined range of a volume average particle diameter MV, it is possible to improve dust workability, and thus desired transparentizing properties are obtained, thereby completing the present invention.

According to the present invention, there is provided a particulate nucleating agent containing a compound represented by General Formula (1), in which in a case where dry measurement of particle diameter distribution of the particulate nucleating agent is performed by using a laser diffraction particle size distribution measurement method, and a maximum particle diameter of the particulate nucleating agent is denoted by $D_{max}$, and a volume average particle diameter is denoted by MV, $D_{max}$ satisfies the following Expression (A) and MV satisfies the following Expression (C).

$$80 \ \mu m \leq D_{max} \leq 300 \ \mu m \quad \text{Expression (A)}$$

$$5 \ \mu m \leq MV \leq 100 \ \mu m \quad \text{Expression (C)}$$

In addition, according to the present invention, a resin composition obtained by causing the particulate nucleating agent to be contained in a thermoplastic resin is provided.

In addition, according to the present invention, a molded product formed by using the resin composition is provided.

In addition, according to the present invention, a production method of producing a molded product by using the resin composition is provided.

Advantageous Effects of Invention

According to the present invention, there are provided a particulate nucleating agent excellent in dust workability and transparentizing properties, a resin composition using thereof, a molded product, and a production method thereof.

DESCRIPTION OF EMBODIMENTS

The particulate nucleating agent of the present embodiment will be described.

The particulate nucleating agent contains an aromatic phosphate ester metal salt. As the aromatic phosphate ester metal salt, a compound represented by the following General Formula (1) is used. The compound may be used alone, or two or more thereof may be used by being combined together.

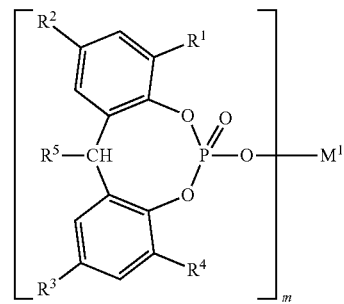

(1)

In General Formula (1), $R^1$ to $R^4$ each independently represent a hydrogen atom, a straight chain or branched alkyl group having 1 to 9 carbon atoms, $R^5$ represents a hydrogen atom or an alkyl group having 1 to 4 carbon atoms, m represents 1 or 2, in a case where m is 1, $M^1$ represents a hydrogen atom, $Al(OH)_2$, or an alkali metal atom, and in a case where m is 2, $M^1$ is a Group II element, $Al(OH)$, or Zn.

In General Formula (1), examples of the alkyl group having 1 to 9 carbon atoms represented by $R^1$, $R^2$, $R^3$, and $R^4$ include a methyl group, an ethyl group, a propyl group, an isopropyl group, a butyl group, a sec-butyl group, a tert-butyl group, an isobutyl group, an amyl group, an isoamyl group, a tert-amyl group, a hexyl group, a cyclohexyl group, a heptyl group, an isoheptyl group, a tert-heptyl group, and the like.

In General Formula (1), examples of an alkali metal represented by $M^1$ include sodium (Na), potassium (K), lithium (Li), and the like.

Examples of a Group II element represented by $M^1$ in the following General Formula (1) include beryllium (Be), magnesium (Mg), Calcium (Ca), strontium (Sr), Barium (Ba), and Radium (Ra), and among these, magnesium and calcium are preferable since the nucleating agent effect of nucleating agent components is prominent.

Among the compounds represented by General Formula (1), a compound in which m is 1 is preferable. In addition, a compound in which $R^1$, $R^2$, $R^3$, and $R^4$ includes one kind selected from the group consisting of a methyl group, an ethyl group, a sec-butyl group, a tert-butyl group, and the like is preferable. In addition, a compound in which $R^5$ is a hydrogen atom or a methyl group is particularly preferable.

As the compound represented by General Formula (1), one or two or more of compounds represented by any one of the following Chemical Formulae (2) to (15) are preferable. Among these, from a viewpoint of improving physical properties of a resin, a compound represented by any one of the Chemical Formulae (2) to (6) is preferable. From a viewpoint of improving transparency, a compound represented by any one of the Chemical Formulas (7) to (15) is preferable.

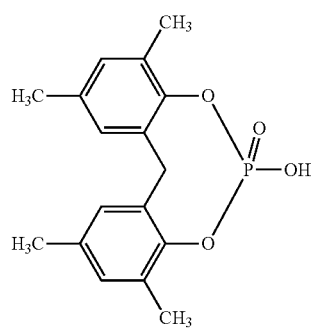 (2)
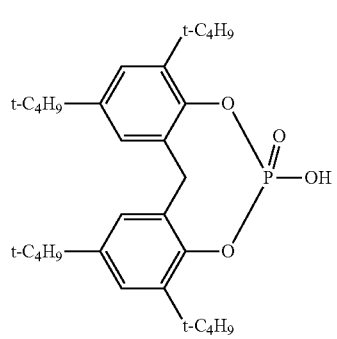 (3)
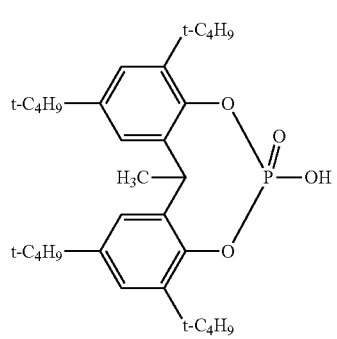 (4)
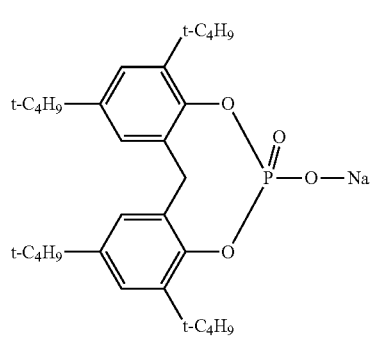 (5)
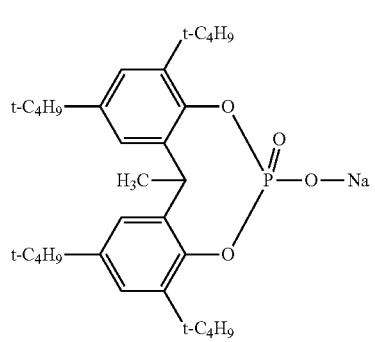 (6)
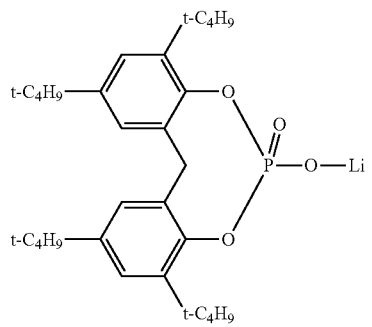 (7)
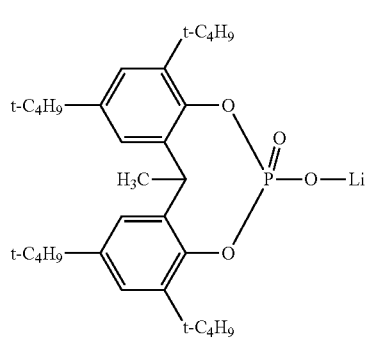 (8)
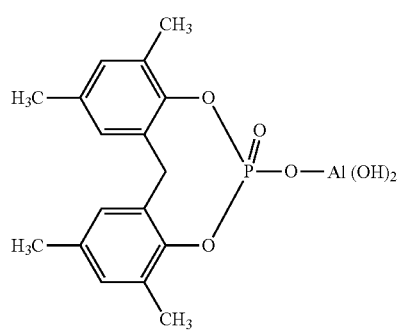 (9)
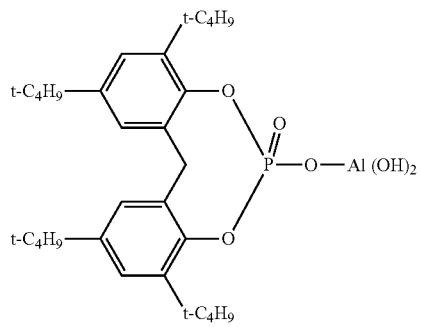 (10)

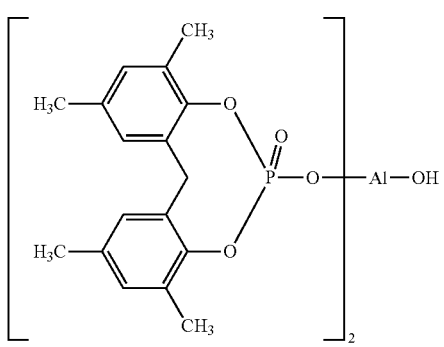

(11)

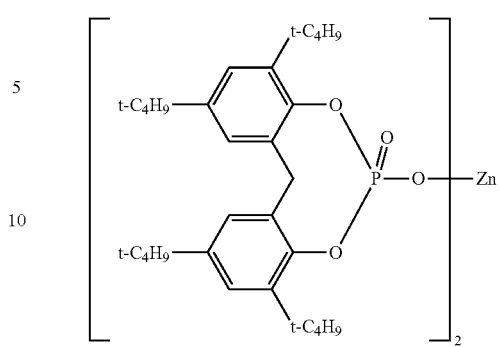

(15)

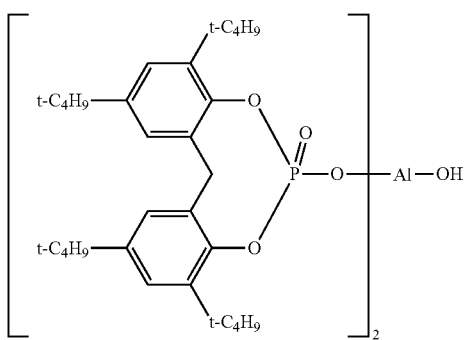

(12)

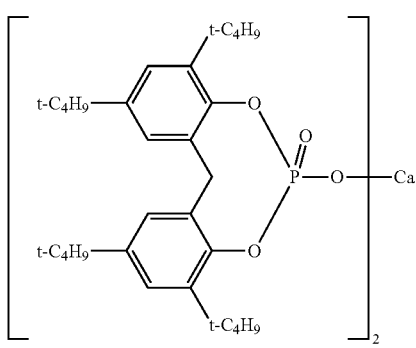

(13)

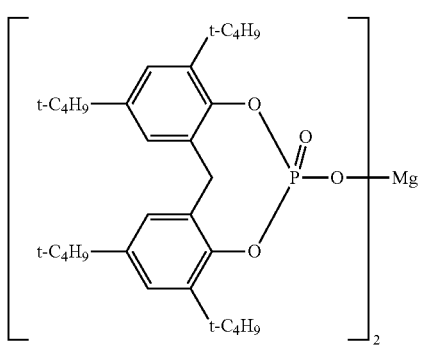

(14)

As a method of producing the compound represented by General Formula (1), phosphorus trichloride (or phosphorus oxychloride) is reacted with 2,2'-alkylidene phenol, and the hydrolysis is performed depending on the necessity to produce a cyclic acid phosphate ester. Subsequently, the cyclic acid phosphate ester is reacted with a metal hydroxide such as sodium hydroxide and potassium hydroxide, and the obtained reactant is appropriately refined (filtered and the like) and dried to obtain the compound (aromatic phosphate ester metal salt). In addition, the aromatic phosphate ester metal salt may be synthesized by a known method in the related art and used as the compound.

In addition, the obtained compound is dissolved in a solvent, reacted with other metal hydroxides such as lithium hydroxide, or reacted with any salt of aluminum, magnesium, and a Group II element, and the obtained reactant is refined and dried to obtain another compound.

A particulate nucleating agent of the present embodiment is obtained by pulverizing the obtained compound using appropriate pulverizing means, depending on the necessity. In the particulate nucleating agent, coarse particles may be removed by being sieved with a sieve of a predetermined mesh size. In addition, the particulate nucleating agent can include one or two or more powdery compounds. For example, two or more compounds having different particle diameter distribution, or classified two or more compounds may be combined and blended with one another at an appropriate proportion to obtain the particulate nucleating agent.

Examples of the pulverizing means include mortar, ball mill, rod mill, tube mill, conical mill, vibratory ball mill, Hyswing ball mill, roller mill, pin mill, hammermill, attrition mill, jet mill, jet miser, micronizer, nanomiser, majac mill, micro-atomizer, colloid mill, premier colloid mill, micron mill, Charlotte colloid mill, rotary cutter, dry medium stirring medium, and the like. These pulverizing machines can be used alone or two or more can be used in combination. In addition, these machines are appropriately selected depending on the type of the raw material powders to be pulverized, the pulverizing time, and the like.

The particulate nucleating agent of the present embodiment may be constituted of only the compound represented by General Formula (1), or may contain other components within a range of achieving the object of the present invention. Examples of the other components include aromatic phosphate ester metal salts other than the compound represented by General Formula (1), fatty acid metal salts, silicic acid-based inorganic additive components, hydrotalcites, and the like. These may be used alone or two or more can be used by being combined together.

As the fatty acid metal salt, those containing a compound represented by the following General Formula (16) are preferable.

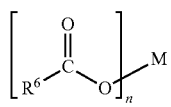
(16)

In General Formula (16), $R^6$ represents a straight chain or branched aliphatic group having 9 to 30 carbon atoms, M represents a metal atom, and n represents an integer of 1 to 4, which is an integer corresponding to the valence of metal atoms of M.

In General Formula (16), $R^6$ is a straight chain or branched aliphatic group having 9 to 30 carbon atoms, and examples thereof include an alkyl group and an alkenyl group having 9 to 30 carbon atoms. This may be substituted with a hydroxyl group.

Examples of the aliphatic group having 9 to 30 carbon atoms include saturated fatty acids such as capric acid, 2-ethylhexane acid, undecylic acid, lauric acid, tridecylic acid, myristic acid, pentadecylic acid, palmitic acid, margaric acid, stearic acid, nonadecylic acid, arachidic acid, hexosyl acid, behenic acid, tricosylic acid, lignoceric acid, cerotic acid, montanoic acid, and melissic acid, straight chain unsaturated fatty acids such as 4-decenoic acid, 4-dodecenoic acid, palmitoleic acid, α-linoleic acid, linoleic acid, γ-linolenic acid, stearidonic acid, petroselinic acid, oleic acid, elaidic acid, vaccenic acid, eicosapentaenoic acid, docosapentaenoic acid, and docosahexaenoic acid, and the like.

In the fatty acid metal salt, an aliphatic group represented by $R^6$ preferably has 10 to 21 carbon atoms. In particular, lauric acid, myristic acid, palmitic acid, stearic acid, behenic acid, oleic acid, and 12-hydroxy stearic acid are preferable.

Examples of metal atom represented by M include alkali metal, magnesium, calcium, strontium, barium, titanium, manganese, iron, zinc, silicon, zirconium, yttrium, barium, hafnium, or the like. Among these, alkali metal such as sodium, lithium, and potassium is preferable, and in particular, sodium and lithium are preferably used since the crystallization temperature thereof is high.

Examples of the silicic acid-based inorganic additive components include fumed silica, particulate silica, silica stone, diatomaceous earth, clay, kaoline, silica gel, calcium silicate, sericite, kaolinite, flint, feldspar flour, vermiculite, attapulgite, talc, mica, minnesotite, pyrophyllite, and the like, and among these, those of which particle structure is a layer-like structure and of which silicon content is 15% by mass or more are preferable. Examples of the preferable inorganic additive include sericite, kaolinite, talc, mica, minnesotite, pyrophyllite, and the like, and talc and mica are more preferable.

The hydrotalcites may be natural products or synthetic products, and can be used regardless of presence or absence of surface treatment or presence or absence of water of crystallization. Examples of the hydrotalcites include basic carbonate represented by the following General Formula.

$$M_xMg_yAl_zCO_3(OH)_{xp+2y+3z-2} \cdot nH_2O$$

(In General Formula, M represents alkali metal or zinc, X represents a number of 0 to 6, y represents a number of 0 to 6, z represents a number of 0.1 to 4, p represents the valence of M, and n represents a number of 0 to 100 of water of crystallization)

The particulate nucleating agent containing the other components is a particulate nucleating agent composition containing the compound represented by General Formula (1), and is obtained by being constituted to contain one or more selected from the group consisting of other aromatic phosphate ester metal salts, fatty acid metal salts, silicic acid-based inorganic additive components, and hydrotalcites, preferably one or more selected from the group consisting of fatty acid metal salts, talc, mica, and hydrotalcites.

Such a particulate nucleating agent is obtained by performing pulverization treatment by appropriately combining the pulverizing means in the co-presence of the compound represented by General Formula (1) and other components, for example. In addition, the pulverizing means, sieving, blending method, and the like can be used.

The particulate nucleating agent of the present embodiment functions as a nucleating agent·a transparentizing agent added at the time of molding process of a thermoplastic resin such as a crystalline polymer. In the crystalline polymer, it is possible to realize improvement (modifying effect) in the crystallization temperature, the thermal modification temperature, the bending elastic modulus, the hardness, the transparency, and the like. In addition, it is possible to enhance molding cycle properties and to improve productivity.

The particulate nucleating agent of a first embodiment contains the compound represented by General Formula (1), and in a case where dry measurement of particle diameter distribution of the particulate nucleating agent is performed by using a laser diffraction particle size distribution measurement method, and a maximum particle diameter of the particulate nucleating agent is denoted by $D_{max}$, and a degree of dispersion of the particulate nucleating agent measured by the following procedure is denoted by $D_p$, $D_{max}$ satisfies the following Expression (A) and $D_p$ satisfies the following Expression (B).

$80 \ \mu m \leq D_{max} \leq 300 \ \mu m$      Expression (A)

$1.0\% \leq D_p \leq 27.0\%$      Expression (B)

(Procedure)

A predetermined amount of a particulate nucleating agent is prepared as a sample. The sample is put into a cylinder from a height of 60 cm, and the sample is dropped in an up and down direction in the cylinder. Then, the amount of the sample remaining on a watch glass installed at the drop point is measured. Using the amount of the input sample and the amount of the sample remaining on the watch glass, a degree of dispersion (%) is measured based on the following expression. Here, the predetermined amount may be about 5 g, and the degree of dispersion may be an average value of three measured values.

Degree of dispersion(%)=[(input sample amount (g)−
sample amount remaining on watch glass (g))/
input sample amount (g)]×100

According to the finding of the present inventors, the following has been found. First, from a viewpoint of improving transparentizing properties, it was considered that the particle diameter of the particulate nucleating agent being small is preferable. However, in a case where a particulate nucleating agent having an excessively small particle diameter is used, dust workability may deteriorate. Therefore, in the treatment of reducing the particle size of the particulate nucleating agent, the pulverizing conditions were changed to relatively mild conditions. As a result, although the dust workability is improved, large particles may be entrapped in the particulate nucleating agent, and with this, there was a concern that transparentizing properties deteriorate.

As a result of research based on such development circumstances, it is possible to improve dust workability by controlling dust characteristics of the particulate nucleating agent by mild pulverizing conditions, and it is possible to improve transparentizing properties by cutting coarse particles by combing.

Furthermore, it was found that by using the degree of dispersion and the maximum particle diameter of the particulate nucleating agent as indices, it is possible to stably evaluate dust workability and transparentizing properties and it is possible to improve the dust workability and the transparentizing properties by controlling the upper limit of the degree of dispersion, which is an index, and the upper limit of the maximum particle diameter to be a predetermined value or less.

Here, an explosion index is usually an index for evaluating the dust explosibility of the powder. Even in a case where the explosion index was low enough not to be practically problematic, it was found that there was room for improvement in workability such as handling properties of the particulate nucleating agent at a time of scale-up.

It was found that by using such an explosion index or a maximum explosion pressure as a guideline and further lowering thereof, it is possible to suppress dust characteristics at the time of scale-up and it is possible to improve workability of the particulate nucleating agent.

In addition, by adopting the dry conditions, there is no problem such as bubbles as compared with wet conditions, and thus it is possible to increase the measurement stability.

In the first embodiment, the upper limit of the maximum particle diameter $D_{max}$ is equal to or less than 300 μm, preferably equal to or less than 295 μm, and more preferably equal to or less than 290 μm. With this, the transparentizing properties of the particulate nucleating agent can be improved. On the other hand, the lower limit of $D_{max}$ is equal to or more than 80 μm, preferably equal to or more than 83 μm, and more preferably equal to or more than 85 μm, for example. With this, it is possible to achieve balance of various physical properties.

In the first embodiment, the upper limit of the degree of dispersion $D_p$ is equal to or less than 27.0%, preferably equal to or less than 26.8%, and more preferably equal to or less than 26.5%, for example. With this, it is possible to improve the dust workability of the particulate nucleating agent and the workability of handling properties of the particulate nucleating agent at the time of scale-up. On the other hand, the lower limit of $D_p$ is equal to or more than 1.0%, preferably equal to or more than 3.0%, and more preferably equal to or more than 5.0%, for example. It is possible to achieve the balance of various physical properties.

In addition, the particulate nucleating agent of a second embodiment contains the compound represented by General Formula (1), and in a case where the particle diameter distribution of the particulate nucleating agent is measured using a laser diffraction particle size distribution measurement method, and the maximum particle diameter of the particulate nucleating agent is denoted by $D_{max}$ and the volume average particle diameter is denoted by MV, $D_{max}$ satisfies the following Expression (A) and MV satisfies the following Expression (C).

$$80 \ \mu m \leq D_{max} \leq 300 \ \mu m \quad \text{Expression (A)}$$

$$5 \ \mu m \leq MV \leq 100 \ \mu m \quad \text{Expression (C)}$$

In addition, according to the finding of the present inventors, as a result of research based on the development circumstances, it was found that it is possible to control dust characteristics by appropriately adjusting the particle diameter profile of the particulate nucleating agent. In addition, it was found that as the particle diameter profile, the dust workability is improved by appropriately controlling the upper limit and the lower limit of the maximum particle diameter $D_{max}$ within a predetermined range of the volume average particle diameter MV, and thus desired transparentizing properties is obtained.

In the second embodiment, the volume average particle diameter MV is equal to or more than 5 μm and equal to or less than 100 μm, preferably equal to or more than 6 μm and equal to or less than 95 μm, and more preferably equal to or more than 7 μm and equal to or less than 90 μm, for example.

In the present specification, "to" indicates that an upper limit and a lower limit are included unless otherwise specified.

In the second embodiment, the upper limit of the maximum particle diameter $D_{max}$ is equal to or less than 300 μm, preferably equal to or less than 295 μm, and more preferably equal to or less than 290 μm. On the other hand, the lower limit of $D_{max}$ is equal to or more than 80 μm, preferably equal to or more than 83 μm, and more preferably equal to or more than 85 μm, for example.

In the particulate nucleating agent of the second embodiment, the volume average particle diameter MV is within the above range, and by setting the upper limit of the maximum particle diameter $D_{max}$ to equal to or less than the above value, the transparentizing properties of the particulate nucleating agent can be improved, and by setting the lower limit of the maximum particle diameter $D_{max}$ to equal to or more than the above value, the dust workability of the particulate nucleating agent and the workability such as handling properties of the particulate nucleating agent at the time of scale-up can be improved.

In addition, the particulate nucleating agent is preferably needle-like particles. At this time, the aspect ratio of the particulate nucleating agent is equal to or more than 1.5 and equal to or less than 10, preferably equal to or more than 2.0 and equal to or less than 8, and more preferably equal to or more than 2.5 and equal to or less than 6, for example. By setting the value within such a numerical value range, it is possible to suppress dust characteristics at a time of molding processing of the crystalline polymer, and dust workability is improved.

In the present embodiment, the aspect ratio of the particulate nucleating agent is calculated from the average of a long axis and a short axis by measuring the lengths of the long axis and the short axis of 100 crystals at random from a micrograph.

In the present embodiment, for example, by appropriately selecting the kind and the blending amount of each component contained in the particulate nucleating agent, the preparation method of the particulate nucleating agent, and the like, it is possible to control the maximum particle diameter, the degree of dispersion, and the volume average particle diameter, and the aspect ratio of the particulate nucleating agent. Among these, for example, appropriately selecting pulverizing conditions such as a pulverizing method and a pulverizing time, classification conditions such as cutting of coarse particles, and the like is exemplified as an element for setting the maximum particle diameter, the degree of dispersion, the volume average particle diameter, and the aspect ratio of the particulate nucleating agent to a desired numerical value range.

The resin composition of the present embodiment contains the particulate nucleating agent in a thermoplastic resin.

A method of adding the particulate nucleating agent to the thermoplastic resin is not particularly limited, and a generally used method can be applied as it is. For example, it is possible to use a method of dry blending a powder product or pellet of the thermoplastic resin and a powder product of the particulate nucleating agent together.

The resin composition can be used in various forms. For example, the form may be any of pellet form, granule form, and powder form. From a viewpoint of handling properties, the pellet form is preferable.

Examples of the thermoplastic resin include a polyolefin-based resin, a styrene-based resin, a polyester-based resin, a polyether-based resin, a polycarbonate-based resin, a polyamide-based resin, a halogen-containing resin, and the like. Among these, a crystalline polymer is preferably used.

In addition, examples of the thermoplastic resin include a thermoplastic resin such as petroleum resin, coumarone resin, polyvinyl acetate, acrylic resin, polymethyl methacrylate, polyvinyl alcohol, polyvinyl formal, polyvinyl butyral, polyphenylene sulfide, polyurethane, fibrous resin, polyimide resin, polysulfone, liquid crystal polymer, and the like and the blended product thereof.

In addition, the thermoplastic resin may be a thermoplastic elastomer such as isoprene rubber, butadiene rubber, acrylonitrile-butadiene copolymer rubber, styrene-butadiene copolymer rubber, polyester-based elastomer, nitrile elastomer, nylon elastomer, vinyl chloride elastomer, polyamide elastomer, polyurethane elastomer, and the like, or these may be used in combination.

The crystalline polymer is not particularly limited, and examples thereof include a polyolefin-based polymer such as polypropylene, high-density polyethylene, low-density polyethylene, straight chain low-density polyethylene, polybutene-1, poly3-methylpentene, poly4-methylpentene, α-olefin polymer such as ethylene/propylene block or random copolymer, and the like; thermoplastic straight chain polyester-based polymer such as polyethylene terephthalate, polybutylene terephthalate, polyhexamethylene terephthalate, and the like; polysulfide-based polymer such as polyphenylene sulfide and the like; polylactic acid-based polymer such as polycaprolactone and the like; straight chain polyamide-based polymer such as polyhexamethylene adipamide and the like; crystalline polystyrene-based polymer such as syndiotactic polystyrene and the like; and the like.

Among these, the polyolefin-based polymer which prominently exhibits the use effect of the nucleating agent of the present invention is preferable, and a polypropylene-based resin such as polypropylene, ethylene/propylene block or random copolymer, α-olefin/propylene block or random copolymer other than ethylene, a mixture of the propylene-based polymer and other α-olefin polymer, and the like is particularly preferable.

The polypropylene-based polymer is useful in a case where the crystalline α-olefin polymer, particularly, a polypropylene-based resin such as polypropylene, ethylene/propylene copolymer, and a mixture of the propylene polymer and other α-olefin polymer is used as the crystalline polymer. The polypropylene-based resin can be used regardless of the extreme viscosity, the isometactic pentad fraction, the density, the molecular weight distribution, the melt flow rate, the rigidity, and the like. For example, the polypropylene-based resin can be also appropriately used as disclosed in Japanese Unexamined Patent Publication No. 63-37148, Japanese Unexamined Patent Publication No. 63-37152, Japanese Unexamined Patent Publication No. 63-90552, Japanese Unexamined Patent Publication No. 63-210152, Japanese Unexamined Patent Publication No. 63-213547, Japanese Unexamined Patent Publication No. 63-243150, Japanese Unexamined Patent Publication No. 63-243152, Japanese Unexamined Patent Publication No. 63-260943, Japanese Unexamined Patent Publication No. 63-260944, Japanese Unexamined Patent Publication No. 63-264650, Japanese Unexamined Patent Publication No. 1-178541, Japanese Unexamined Patent Publication No. 2-49047, Japanese Unexamined Patent Publication No. 2-102242, Japanese Unexamined Patent Publication No. 2-251548, Japanese Unexamined Patent Publication No. 2-279746, Japanese Unexamined Patent Publication No. 3-195751, and the like.

A content of the particulate nucleating agent can be generally within a range of 0.001 to 10 parts by weight, preferably 0.005 to 8 parts by weight, and more preferably 0.01 to 5 parts by weight, with respect to 100 parts by weight of the thermoplastic resin (for example, crystalline polymer). With this, it is possible to sufficiently obtain the effect of modifying the thermoplastic resin, particularly the crystalline polymer.

The resin composition of the present embodiment can contain an additive such as anti-oxidant, photostabilizer, ultraviolet absorbing agent, pigment, filler, organic tin compound, plasticizer, epoxy compound, foaming agent, anti-static agent, flame retardant, lubricant, heavy metal inert agent, hydrotalcites, organocarboxylic acid, coloring agent, silicic acid-based additive, and processing aid. These may be used alone or two or more can be used by being combined together.

Examples of the anti-oxidant include a phosphorus-based anti-oxidant, a phenol-based anti-oxidant, a thioether-based anti-oxidant, a phosphite-based anti-oxidant, and the like.

Examples of the anti-static agent include a cationic surfactant, an anionic surfactant, a nonionic surfactant, an ampholytic surfactant, and the like.

Examples of the flame retardant include a halogen-based compound, a phosphate ester compound, a phosphate amid compound, a melamine-based compound, a melamine salt compound of polyphosphate, a fluorine resin, or a metal oxide, and the like.

Examples of the lubricant include a hydrocarbon-based lubricant, a fatty acid-based lubricant, an aliphatic alcohol-based lubricant, an aliphatic ester-based lubricant, an aliphatic amide-based lubricant, a metal soap-based lubricant, and the like.

Examples of the silicic acid-based additive include fume silica, fine particle silica, silica stone, diatomaceous earth, clay, kaoline, silica gel, calcium silicate, sericite, kaolinite, flint, feldspar flour, vermiculite, attapulgite, talc, mica, minnesotite, pyrophyllite, and the like.

A content of the additive in the resin composition is preferably 0.001 to 10 parts by weight, for example, with respect to 100 parts by weight of a crystalline polymer. By setting the content of the additive to be within such a numerical value range, the effect of the additive is improved.

The resin composition can be used in a molded product such as injection molded product, fiber, flat yarn, biaxially stretched film, uniaxially stretched film, non-stretched film, sheet, thermoformed product, extrusion blow-molded product, injection blow-molded product, injection stretching blow-molded product, profile extrusion-molded product, rotationally molded product, and the like. Among these, the injection molded product, the film, the sheet, and the thermoformed product are preferable as the molded product.

The method of producing the molded product of the present embodiment includes a step of molding a resin composition based on various molding methods. With this, it is possible to obtain the molded product.

The molding method is not particularly limited, and examples thereof include an injection molding method, an extrusion molding method, a blow molding method, a rotational molding method, a vacuum molding method, an inflation molding method, a calendar molding method, a slush molding method, a dip molding method, a foaming molding method, and the like. Among these, the injection molding method, the extrusion molding method, and the blow molding method are preferable.

The resin composition can be used in various uses such as construction materials, agricultural materials, components for vehicles such as automobiles, trains, ships, and the like, packaging materials, miscellaneous goods, toys, home appliances, medical supplies, and the like. Specifically, automobile components such as bumper, dashboard, instrument panel, battery case, luggage case, door panel, door trim, fender liner, and the like; resin components for home appliances such as refrigerator, washing machine, vacuum cleaner, and the like; household goods such as tableware, bottle cap, bucket, bathing article, and the like; resin components for connection such as connector and the like; miscellaneous goods such as toys, storage containers, synthetic paper, and the like; medical molded products such as medical pack, syringe, catheter, medical tube, syringe preparation, infusion solution bag, reagent container, medicine container, medicine unit packaging, and the like; building materials such as wall material, floor material, window frame, wall paper, window, and the like; wire coating materials; agricultural materials such as house, tunnel, flat yarn mesh bag, and the like; industrial materials such as pallet, pail can, backgrind tape, tape for liquid crystal protection, pipe, modified silicone polymer for sealing material, and the like; food packaging materials such as wrap, tray, cup, film, bottle, cap, preservation container, and the like; other 3D printer materials, separator film for battery, and the like. In addition, the resin composition can be used in uses in a case where various post-treatments are performed, for example, uses in a case where sterilization by radiation is performed such as medial use and food packaging use, uses in a case where low-temperature plasma treatment and the like are performed after molding in order to improve surface properties such as coating properties, or the like. Among these, the resin composition is preferably used in automobile components, household goods, and food packaging materials.

Hereinafter, the present invention will be described in detail with reference to examples. However, the present invention is not limited to the descriptions of the examples. In addition, the present invention is not limited to the above-described embodiment, and includes modifications and improvements within a range capable of achieving the object of the present invention.

Hereinafter, examples of the reference embodiment will be additionally described.

1. A particulate nucleating agent containing a compound represented by the following General Formula (1), in which a volume average particle diameter of the particulate nucleating agent according to a laser diffraction particle size distribution measurement method is denoted by MV, and a maximum particle diameter is denoted by $D_{max}$, a particle diameter profile of the particulate nucleating agent satisfies the following Expressions (A) and (B).

$$5 \text{ μm} < MV < 100 \text{ μm} \qquad \text{Expression (A)}$$

$$80 \text{ μm} < D_{max} < 300 \text{ μm} \qquad \text{Expression (B)}$$

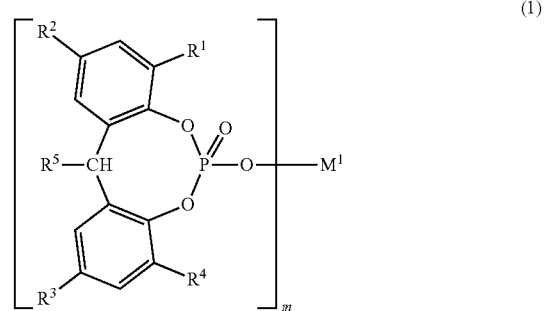

(1)

(In the General Formula (1), $R^1$ to $R^4$ each independently represent a hydrogen atom, a straight chain or branched alkyl group having 1 to 9 carbon atoms, $R^5$ represents a hydrogen atom or an alkyl group having 1 to 4 carbon atoms, m represents 1 or 2, in a case where m is 1, $M^1$ represents a hydrogen atom, $Al(OH)_2$, or an alkali metal atom, and in a case where m is 2, $M^1$ represents a Group II element, $Al(OH)$, or Zn.)

2. The particulate nucleating agent according to 1, in which an aspect ratio of the particulate nucleating agent is equal to or more than 1.5 and equal to or less than 10.

3. The particulate nucleating agent according to 1 or 2, in which the compound includes one or two or more compounds represented by any one of the following Formulae No. 1 to No. 12.

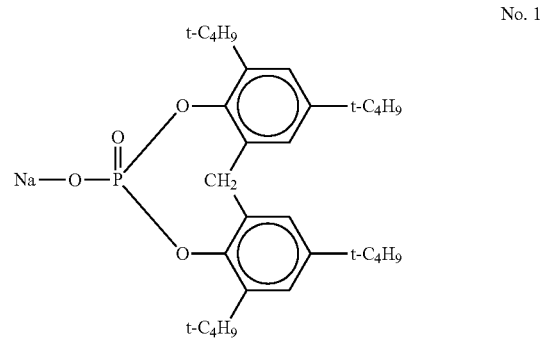

No. 1

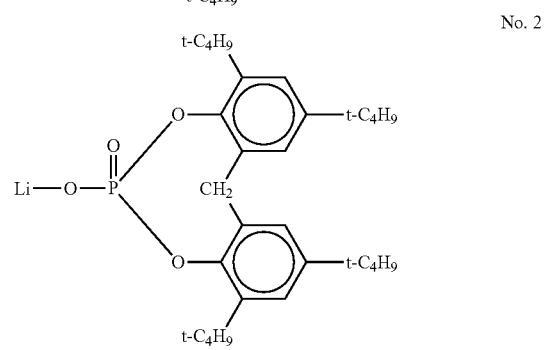

No. 2

No. 3
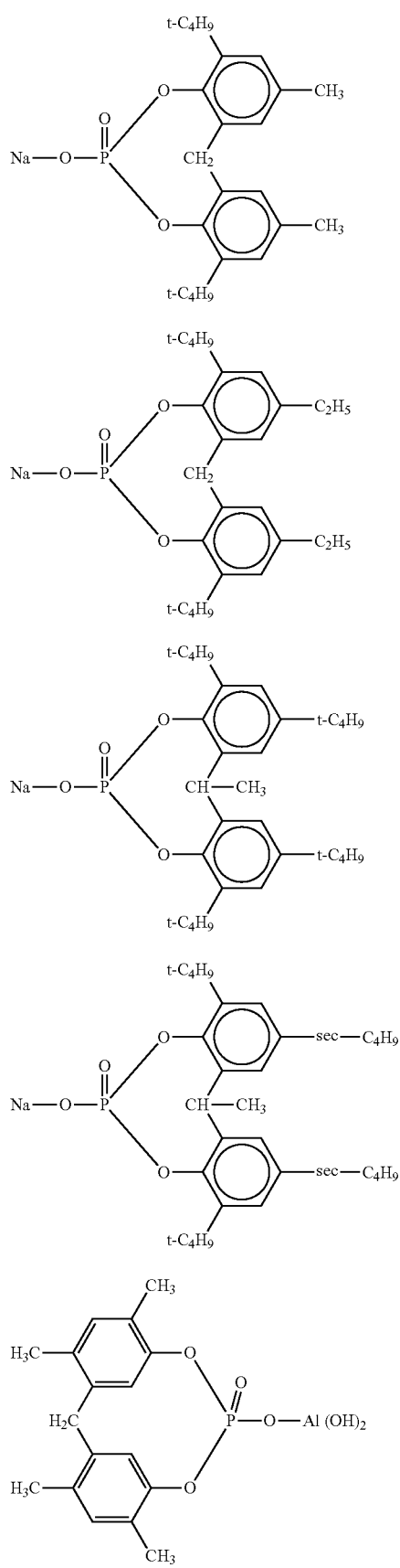
No. 4
No. 5
No. 6
No. 7
No. 8
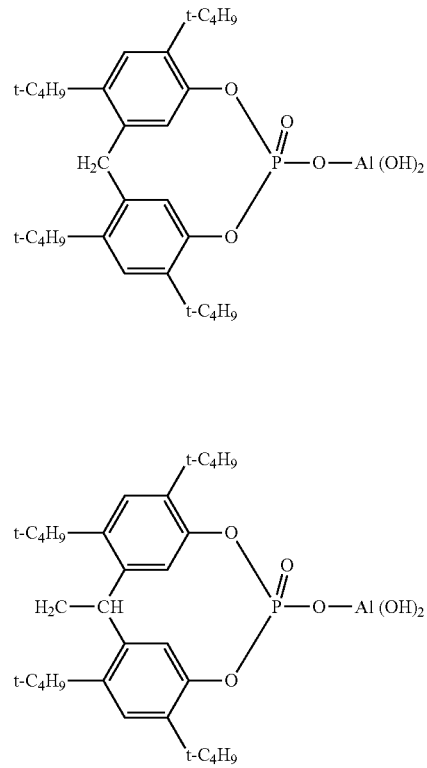
No. 9
No. 10
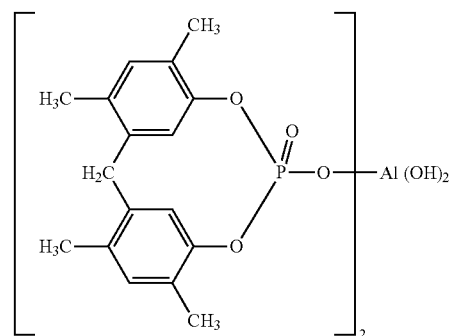
No. 11
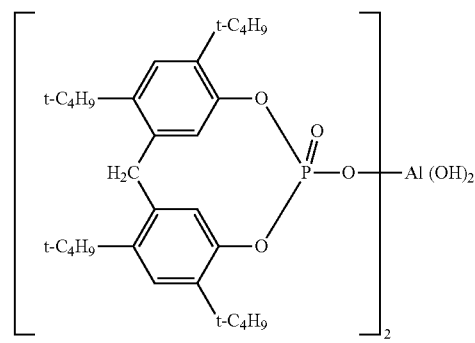

-continued

No. 12

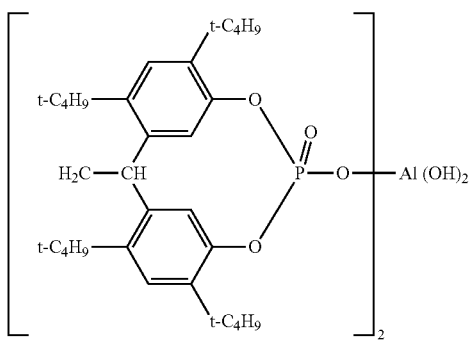

4. A resin composition containing the particulate nucleating agent according to any one of 1 to 3 in a crystalline polymer.

5. The crystalline polymer composition according to 4, in which the crystalline polymer includes a polyolefin-based polymer.

6. The crystalline polymer composition according to 4 or 5, in which a content of the particulate nucleating agent is equal to or more than 0.001 parts by weight and equal to or less than 10 parts by weight, with respect to 100 parts by weight of the crystalline polymer.

7. The crystalline polymer composition according to any one of 4 to 6, which is in a pellet form.

EXAMPLES

Hereinafter, the present invention will be described in detail with reference to examples, but the present invention is not limited to the description of these examples.

(Synthesis of Compound No. 1)

486 g of 2,2'-methylene bis[4,6-di-t-butylphenyl]phosphate (1 mol), 42 g of sodium hydroxide (1.05 mol), and 100 g of a queous solution, and 97 g of methanol were put into a kneader and stirred therein at room temperature for 1 hour. The resultant product was dried under pressurization, and pulverized to obtain 421 g of white powdery Compound No. 1.

Compound No. 1

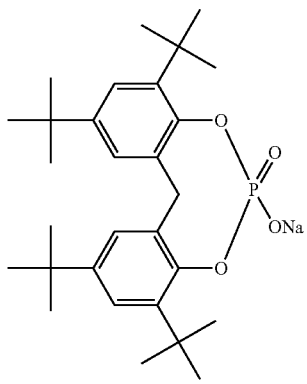

Test Example 1

The obtained Compound No. 1 was sieved with a sieve having a mesh size: 355 μm without pulverization to obtain a particulate nucleating agent A.

Test Example 2

The obtained Compound No. 1 was pulverized with a ball mill for 30 minutes, and sieved with a sieve having a mesh size of 355 μm to obtain a particulate nucleating agent B.

Test Example 3

The obtained Compound No. 1 was pulverized with a ball mill for 4 hours and sieved with a sieve having a mesh size: 355 μm to obtain a particulate nucleating agent C.

Test Example 4

The obtained Compound No. 1 was pulverized with a ball mill for 4 hours, further pulverized with a jet mill, and sieved with a sieve having a mesh size: 355 μm to obtain a particulate nucleating agent D.

TABLE 1

| | Unit | Test Example 1 | Test Example 2 | Test Example 3 | Test Example 4 |
|---|---|---|---|---|---|
| Maximum particle diameter ($D_{max}$) | μm | 198.2 | 142.5 | 87.2 | 11.7 |
| Volume average particle diameter (MV) | μm | 34.5 | 9.2 | 11.1 | 1.9 |
| Degree of dispersion | % | 13.0 | 21.5 | 26.2 | 27.1 |
| Aspect ratio | | 3.1 | 4.5 | 3.0 | 1.9 |

With respect to the obtained particulate nucleating agents A to D, the particle diameter distribution, the degree of dispersion, and the aspect ratio were measured as described below. The result is shown in Table 1.

Based on the results of the particle diameter distribution and the degree of dispersion described above, the obtained particulate nucleating agents A to C of Test Examples 1 to 3 were used as the particulate nucleating agents of Examples 1 to 3, and the obtained particulate nucleating agent D of Test Example 4 was used as a particulate nucleating agent of Comparative Example 1.

(Volume Average Particle Diameter, Maximum Particle Diameter)

A volume average particle diameter MV and a maximum particle diameter $D_{max}$ were measured using a laser diffraction particle size distribution measurement device (Microtrac MT3000II) under dry conditions.

(Degree of Dispersion)

The degree of dispersion (%) of the obtained particulate nucleating agent was measured using a powder property evaluation device (Multi Tester MT-02 manufactured by Seishin Enterprise Co., Ltd.).

Specifically, the measurement was performed as follows.

First, as a sample, about 5 g of the obtained particulate nucleating agent, a charging container having an inner diameter of 3 cm and having an openable/closable shutter at the bottom, and a cylinder having an inner diameter of 10 cm and a height of 50.5 cm, and a watch glass having a diameter of 10 cm were prepared.

Subsequently, the sample was placed in the charging container, and the charging container was set such that the bottom had a height of 60 cm.

Subsequently, the charging container was set on the cylinder, and the watch glass was set below the cylinder. A distance between the lower end of the cylinder and a surface of the watch glass was about 9 cm.

Subsequently, the sample was put into the cylinder by opening the shutter at the bottom of the charging container, and the sample was dropped at a stretch in an up and down direction (vertical direction) inside the cylinder.

Thereafter, an amount of the sample remaining without scattering on the watch glass set at the drop point of the sample was measured, and the degree of dispersion (%) was calculated from the following expression. The degree of dispersion was measured three times for each particulate nucleating agent, and an average value of the values is shown in Table 1.

Degree of dispersion(%)=[(input sample amount (g)−sample amount remaining on watch glass (g))/input sample amount (g)]×100

(Aspect Ratio)

As for the aspect ratio, lengths of a long axis and a short axis of 100 crystals at random were measured from a micrograph, and the average of the long axis and the short axis was obtained.

Evaluation on the particulate nucleating agent of each of examples and comparative example was performed based on the following evaluation items. The evaluation result is shown in Table 2.

TABLE 2

| | Unit | Example 1 | Example 2 | Example 3 | Comparative Example 1 |
|---|---|---|---|---|---|
| Particulate nucleating agent | | A | B | C | D |
| Maximum explosion pressure | $10^2$ kPa | 7.8 | 8.0 | 8.5 | 8.5 |
| Explosion index ($K_{st}$ value) | $10^2$ kPa · m/s | 181 | 269 | 269 | 346 |
| Haze@1 mm | % | 25 | 23 | 22 | 21 |

(Maximum Explosion Pressure, Explosion Index)

The explosion index ($K_{st}$) and the maximum explosion pressure were measured in accordance with JIS Z 8817: 2002.

$$K_{st}[10^2 \text{ kPa·m/s}] = (dp/dt)_{max} \times V^{1/3}$$

$(dp/dt)_{max}$: maximum pressure rise rate, V: measurement container volume

It was found that the particulate nucleating agents of Examples 1 to 3 were excellent in handling properties at the time of scale-up and excellent in dust workability compared to the particulate nucleating agents of Comparative Example 1.

Haze: A composition obtained by mixing 100 parts by weight of polypropylene with 0.1 part by weight of the obtained particulate nucleating agent was mixed for 1 minute with a Henschel mixer, and extruded at 230° C. and 150 rpm to produce pellets. Haze (haze value: %) of a test piece having a thickness of 1 mm obtained by injection molding the resultant product at 200° C. was measured based on JIS K7105.

Comparative Example 2

Without sieving, in a case where the maximum particle diameter $D_{max}$ is more than 355 μm, a particulate nucleating agent E represented by Compound No. 1 was prepared.

It was recognized that in a case where Haze was measured using the particulate nucleating agent E by the above-described method, the haze value was higher than in the cases of Examples 1 to 3.

The particulate nucleating agents of Examples 1 to 3 have a smaller haze value within a range not to be practically problematic compared to the particulate nucleating agent of Comparative Example 2, and it is possible to improve transparency of the crystalline polymer, and thus it was recognized that the particulate nucleating agents of Examples 1 to 3 can be appropriately used as a nucleating agent and a transparentizing agent.

This application claims priority based on Japanese Patent Application No. 2018-025245 filed on Feb. 15, 2018, the entire disclosure of which is incorporated herein.

The invention claimed is:

1. A particulate nucleating agent comprising:
   a compound represented by the following General Formula (1),
   wherein in a case where dry measurement of particle diameter distribution of the particulate nucleating agent is performed by using a laser diffraction particle size distribution measurement method, a maximum particle diameter of the particulate nucleating agent is denoted by $D_{max}$, and a degree of dispersion of the particulate nucleating agent is denoted by $D_p$,
   $D_{max}$ satisfies the following Expression (A) and $D_p$ satisfies the following Expression (B), $$80 \text{ μm} \leq D_{max} \leq 300 \text{ μm} \quad \text{Expression (A)}$$

$$1.0\% \leq D_p \leq 27.0\% \quad \text{Expression (B)}$$

wherein $D_p$ is determined according to the following procedure:
   an input sample amount of about 5 g of the particulate nucleating agent is placed in a charging container having inner diameter of 3 cm and an openable/closable shutter at the bottom;
   the charging container with input sample is situated on a vertical cylinder having an inner diameter of 10 cm and a height of 50.5 cm;
   a watch glass having diameter 10 cm is situated below the cylinder, such that the distance between the lower end of the cylinder and the watch glass is about 9 cm;
   the shutter is opened thereby permitting the input sample to drop through the cylinder onto the watch glass; and
   a remaining sample amount is determined by measuring mass of particulate nucleating agent deposited on the watch glass;
   wherein $D_p$ (%)=[(input sample amount (g)−remaining sample amount (g))/input sample amount (g)]×100;

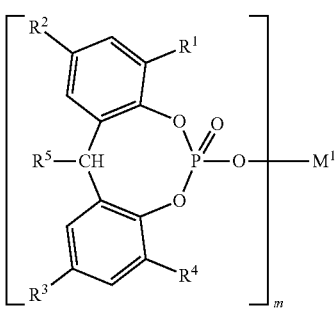

(1)

wherein in General Formula (1), $R^1$ to $R^4$ each independently represents a hydrogen atom, a straight chain or branched alkyl group having 1 to 9 carbon atoms, $R^5$ represents a hydrogen atom or an alkyl group having 1 to 4 carbon atoms, m represents 1 or 2, in a case where m is 1, $M^1$ represents a hydrogen atom, $Al(OH)_2$, or an alkali metal atom, and in a case where m is 2, $M^1$ represents a Group II element, $Al(OH)$, or Zn.

2. A particulate nucleating agent comprising:
a compound represented by the following General Formula (1),
wherein in a case where dry measurement of particle diameter distribution of the particulate nucleating agent is performed by using a laser diffraction particle size distribution measurement method, a maximum particle diameter of the particulate nucleating agent is denoted by $D_{max}$, and a volume average particle diameter is denoted by MV, $D_{max}$ satisfies the following Expression (A) and MV satisfies the following Expression (C)

80 µm≤$D_{max}$≤300 µm      Expression (A)

1.0%≤$D_p$≤27.0%      Expression (B)

5 µm≤$MV$≤100 µm      Expression (C)

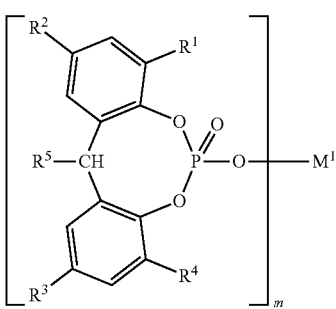

(1)

wherein in General Formula (1), $R^1$ to $R^4$ each independently represents a hydrogen atom, a straight chain or branched alkyl group having 1 to 9 carbon atoms, $R^5$ represents a hydrogen atom or an alkyl group having 1 to 4 carbon atoms, m represents 1 or 2, in a case where m is 1, $M^1$ represents a hydrogen atom, $Al(OH)_2$, or an alkali metal atom, and in a case where m is 2, $M^1$ represents a Group II element, $Al(OH)$, or Zn.

3. The particulate nucleating agent according to claim 1, wherein an aspect ratio of the particulate nucleating agent is equal to or more than 1.5 and equal to or less than 10.

4. The particulate nucleating agent according to claim 1, wherein the compound contains one or two or more compounds represented by the following Chemical Formulae (2) to (15).

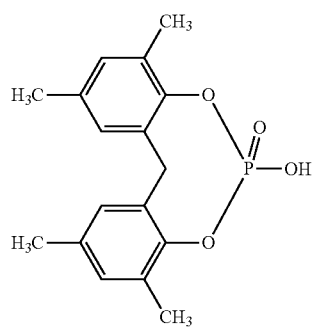

(2)

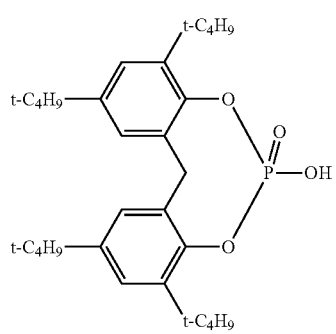

(3)

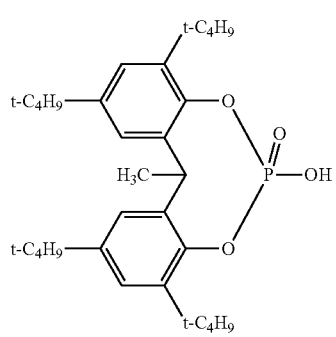

(4)

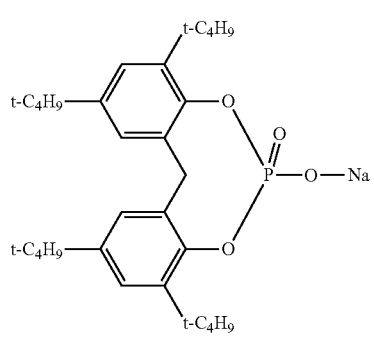

(5)

-continued
(6)
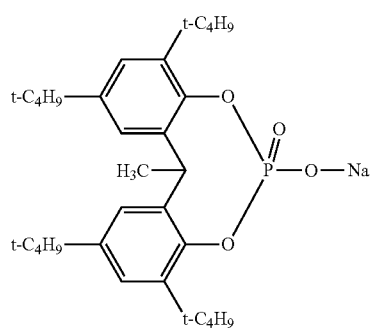
(7)
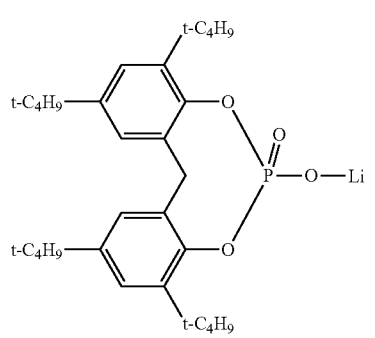
(8)
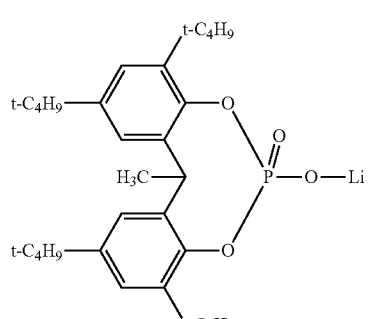
(9)
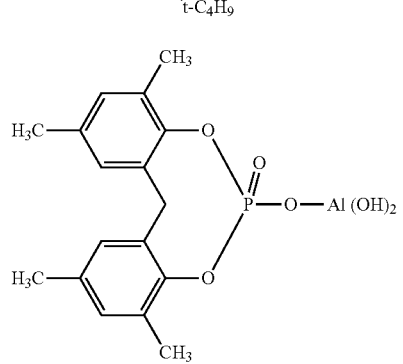
(10)
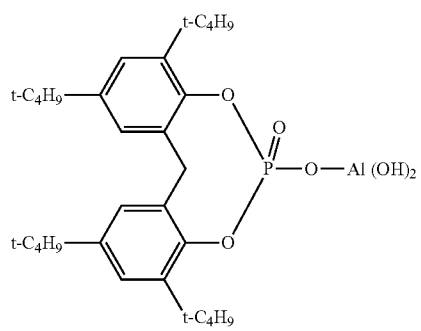
-continued
(11)
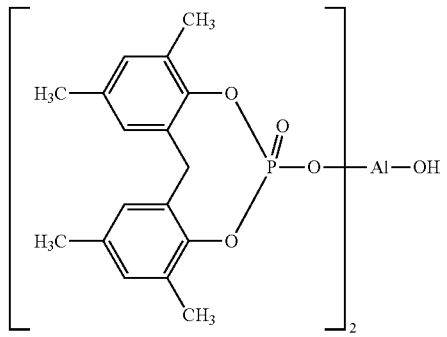
(12)
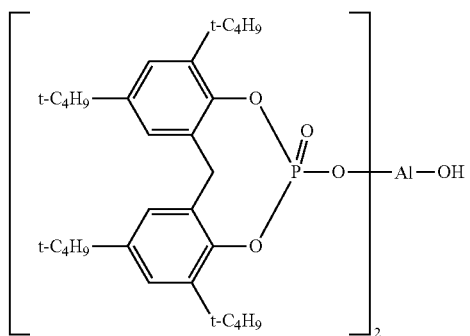
(13)
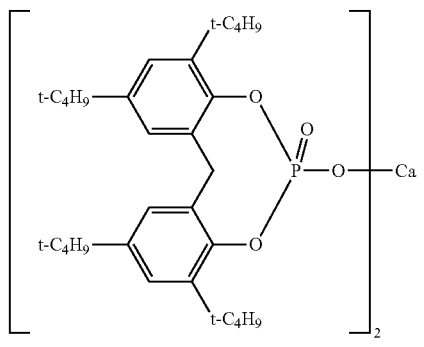
(14)
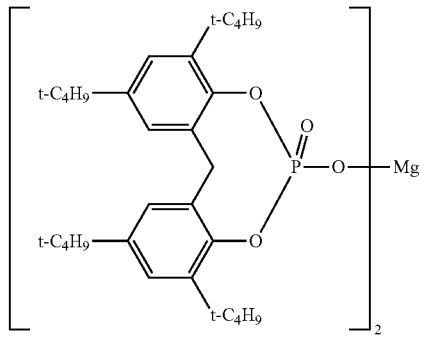

-continued

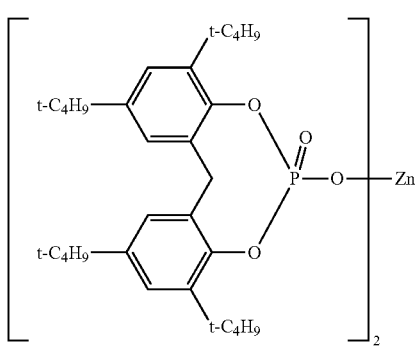

(15)

5. A resin composition containing the particulate nucleating agent according to claim 1 in a thermoplastic resin.

6. The resin composition according to claim 5, wherein the thermoplastic resin contains a crystalline polymer.

7. The resin composition according to claim 6, wherein the crystalline polymer includes a polyolefin-based polymer.

8. The resin composition according to claim 5, wherein a content of the particulate nucleating agent is equal to or more than 0.001 parts by weight and equal to or less than 10 parts by weight, with respect to 100 parts by weight of the thermoplastic resin.

9. The resin composition according to claim 5, which is in a pellet form.

10. A molded product obtained by using the resin composition according to claim 5.

11. A production method of producing a molded product using the resin composition according to claim 5.

12. The resin composition containing the particulate nucleating agent according to claim 2 in a thermoplastic resin.

13. A production method of producing a molded product using the resin composition according to claim 12.

\* \* \* \* \*

UNITED STATES PATENT AND TRADEMARK OFFICE
CERTIFICATE OF CORRECTION

PATENT NO. : 11,130,851 B2
APPLICATION NO. : 16/967355
DATED : September 28, 2021
INVENTOR(S) : Horikoshi et al.

It is certified that error appears in the above-identified patent and that said Letters Patent is hereby corrected as shown below:

In the Claims

Column 23 Line 38, Claim 2, Line 13, the text "$1.0\% \leq D_p \leq 27.0\%$     Expression (B)" should be canceled.

Signed and Sealed this
First Day of March, 2022

Drew Hirshfeld
*Performing the Functions and Duties of the*
*Under Secretary of Commerce for Intellectual Property and*
*Director of the United States Patent and Trademark Office*